(12) United States Patent
McCaughan et al.

(10) Patent No.: US 8,668,370 B2
(45) Date of Patent: Mar. 11, 2014

(54) DIMPLED LIGHT DISTRIBUTION PLATES

(75) Inventors: Leon McCaughan, Madison, WI (US); Thomas F. Kuech, Madison, WI (US); Christopher J. Zenner, Madison, WI (US); Cedric Meyers, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 13/463,151

(22) Filed: May 3, 2012

(65) Prior Publication Data

US 2013/0294064 A1    Nov. 7, 2013

(51) Int. Cl.
*F21V 11/00*    (2006.01)
*F21V 9/14*    (2006.01)

(52) U.S. Cl.
USPC ............... 362/611; 362/606; 362/311.01

(58) Field of Classification Search
CPC .. H01L 33/24; H01L 33/20; G02D 1/133615; G02F 1/133605
USPC ........ 313/498–512; 362/600, 97.1, 362, 611, 362/294.01, 555, 606; 257/E33.059, 257/E33.072, 89, 99
See application file for complete search history.

(56) References Cited

U.S. PATENT DOCUMENTS

| | | | |
|---|---|---|---|
| 6,199,989 B1 | 3/2001 | Maeda et al. | |
| 7,722,238 B2 | 5/2010 | Uehara et al. | |
| 2004/0125592 A1 | 7/2004 | Nagakubo et al. | |
| 2005/0185416 A1 | 8/2005 | Lee et al. | |
| 2006/0221634 A1 | 10/2006 | Sato et al. | |
| 2011/0216267 A1* | 9/2011 | Miyamoto et al. | 349/62 |

* cited by examiner

*Primary Examiner* — Tracie Y Green
(74) *Attorney, Agent, or Firm* — Bell & Manning, LLC

(57) ABSTRACT

Dimpled plates for light distribution and concentration are provided. Also provided are apparatus incorporating the plates as waveguides, and methods for using the dimpled plates for distributing or concentrating input light. The dimpled plates are designed to spatially distribute light from each of one or more near point light sources into a pixelated light projection using an array of reflective conical light deflection elements.

20 Claims, 10 Drawing Sheets

DIMPLED LIGHT DISTRIBUTION PLATES

REFERENCE TO GOVERNMENT RIGHTS

This invention was made with government support under W81XWH-05-1-0363 awarded by the ARMY/MRMC. The government has certain rights in the invention.

BACKGROUND

Many lighting and imaging systems employ near point light sources, such as light emitting diodes and laser diodes, as sources of illumination. Although such systems can be more efficient than lighting systems that rely on more conventional diffuse lighting sources, they typically require a significant number of near point light sources to illuminate the desired area. For example, back-lit signs, computer and television screens, and stop-signs typically use a large two-dimensional array of near point light sources, where the area of the array and, therefore, the number of near point sources in the array increases in proportion to the size of the area to be illuminated. Similarly, near point light sources used in spatial and spectroscopic medical imaging applications are often used in a one-to-one ratio of light source to detectors in a detector array. Unfortunately, as the desired array size increases, the practicality of increasing the size and number of near point light sources in the array decreases.

SUMMARY

Dimpled plates for use as waveguides for the spatial distribution or concentration of light are provided. Also provided are light distribution or concentration apparatus incorporating the dimpled plates and method for distributing or concentrating lights using the dimpled plates.

The dimpled plates comprise: (a) a layer of material that is optically transparent to selected wavelengths of light (e.g., visible light, ultraviolet light or solar radiation), the layer of material comprising an upper surface; a lower surface disposed opposite the upper surface; and an edge surface that bridges the upper and lower surfaces along their perimeter; wherein the upper surface defines a plurality of inverted, right circular cone-shaped indentations that extend toward the lower surface; and (b) a coating of optically reflective material disposed on at least those portions of the upper surface that define the interior surfaces of inverted, right circular cone-shaped indentations. In some embodiments, the inverted, right circular cone-shaped indentations are characterized by one or more of the following properties: the depth of the inverted, right circular cone-shaped indentations is at least 70% of the thickness of the layer of material; the inverted, right-circular cone-shaped indentations have a cone base diameter in the range from about 0.1 mm to about 5 mm and a cone depth in the range from about 0.1 mm to about 5 mm; and the inverted, right-circular cone-shaped indentations have a cone base diameter to cone depth ratio in the range from 3:1 to 1:3.

A light distribution apparatus incorporating a dimpled plate comprises: (a) a light distribution plate comprising: (i) a layer of optically transparent material, the layer of optically transparent material comprising an upper surface; a lower surface disposed opposite the upper surface; and an edge surface that bridges the upper and lower surfaces along their perimeter; wherein the upper surface defines a plurality of inverted, right circular cone-shaped indentations that extend toward the lower surface; and (ii) a coating of optically reflective material disposed on at least those portions of the upper surface that define the interior surfaces of inverted, right circular cone-shaped indentations; and (b) one or more near point light sources configured to direct light into the edge surface of the layer optically transparent material. In these apparatus, the light distribution plate is configured such that light directed into the edge surface of the layer optically transparent material by the one or more near point light sources and reflected from the coating of optically reflective material on the interior surfaces of the plurality of inverted, right circular cone-shaped indentations will be projected onto the lower surface of the layer of optically transparent material with a pixelated spatial intensity distribution.

In the light distribution plates, the coating of optically reflective material can be disposed over at least a portion of the lower surface and at least a portion of the edge surface of the layer of optically transparent material, such that the coating of optically reflective material defines at least one input light aperture along the edge surface and one or more output light apertures on the lower surface, the centers of the output light apertures being aligned with the apexes of the inverted, right circular cone-shaped indentations.

The near point light sources can be broadband, narrowband or monochromatic light sources. In those embodiments where more than one near point light source is used, the light sources can emit light in the same or in different wavelength ranges.

A method for the spatial distribution of light using the light distribution apparatus comprises the step of directing light from the one or more near point light sources into the edge surface of the layer of optically transparent material, whereby the coating of optically reflective material on the interior surfaces of the inverted, right circular cone-shaped indentations laterally reflects the light, such that it is projected onto the lower surface of the layer of optically transparent material with a pixelated spatial intensity distribution.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Dimpled plates for light distribution and concentration are provided. Also provided are apparatus incorporating the plates as waveguides, and methods for using the dimpled plates for distributing or concentrating input light.

In certain embodiments, the dimpled plates provide light distribution plates designed to spatially distribute light from each of one or more near point light sources into a pixelated light projection using an array of conical light deflection elements. The conical light deflection elements, which have an internal reflective coating, anisotropically redirect the light incident thereon into collimated output light beams. The conical light deflection elements can be dimensioned such that this anisotropic redirection is wavelength independent and, therefore, provides the same spatial distribution for all wavelengths emitted by the near point light sources. The light deflection elements can also be dimensioned so that they provide a desired intensity distribution as a function of position.

The light distribution plates make it possible to reduce the number of point light sources needed to illuminate a given area and, as such, find uses in a broad range of applications. Applications which may take advantage of these include residential and commercial lighting application, back illumination of television and computer monitors, and spatial and spectroscopic imaging applications.

In other embodiments, the dimpled plates provide light concentrating plates designed to focus broadly spatially distribute input light into a more concentrated output light distribution. In these embodiments, the reflective conical light deflection elements laterally redirect, focus and concentrate light incident upon the plate over a relatively large surface area, such that the redirected light exits the dimpled plate over a narrower surface area. Applications which may take advantage of the light concentrating plates include solar concentrators and light detectors which, in effect, amplify faint radiation incident over a large area (e.g., for astronomical, bioluminescent, and other scientific applications).

Figure 1:
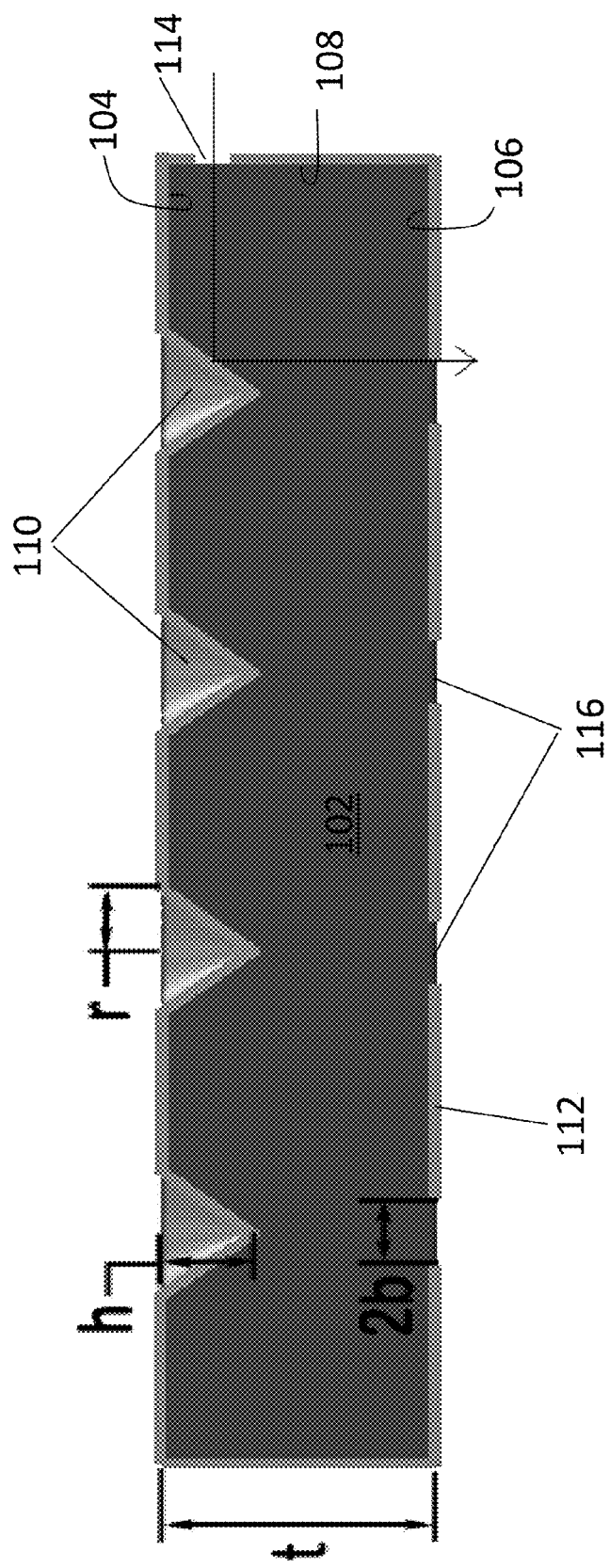
FIG. 1 is a schematic diagram of a cross-sectional side-view of a planar dimpled plate.

FIG. 1 shows a schematic illustration of an embodiment of a dimpled plate. The plate comprises a layer of optically transparent material 102, the layer of optically transparent material comprising a dimpled upper surface 104; a lower surface 106 disposed opposite the upper surface; and an edge surface 108 connecting the upper and lower surfaces along their perimeters. Upper surface 104 of the plate defines a plurality of inverted, right circular cone-shaped indentations 110 that extend toward lower surface 106. A coating of optically reflective material 112 (represented by the thick black line) is disposed on upper surface 104 (including within conical indentations 110), lower surface 106; and the edge surface 108. Coating 112 defines at least one input light aperture 114 along edge surface 108 and a plurality of output light apertures 116 on lower surface 106. In this embodiment, output apertures 116 are aligned such that the center of each aperture lies directly beneath the apex of one of the inverted, right circular cone-shaped indentations.

The layer of optically transparent material is made from a material that is optically transparent to the light emitted from the chosen input light sources. By "optically transparent" it is meant that the substantial majority of the desired input light is transmitted through the material without being absorbed. Thus, an optically transparent material will commonly have a percent transmittance of at least 90%. More desirably, the percent transmittance will be at least 95%. Examples of materials that are optically transparent to visible light (e.g., light having wavelengths from about 700 nm to about 400 nm) are glass, poly(methyl methacrylate) (PMMA) and polycarbonate (PC).

The layer of optically transparent material is desirably quite thin, particularly in those embodiments intended for edge-lit lighting applications. The use of a thin layer of the optically transparent material is advantageous because it increases the probability that edge surface-entrant photons will traverse the material in a substantially planar direction (i.e., substantially perpendicular to the surface normal of the layer), thereby increasing the efficiency of the spatial redistribution of the light. Also, a high transparency provides for a long path length for the light, increasing the probability that the input light will interact with the deflecting dimples multiple times by way of multiple reflections from the planar guiding surfaces and its edges. By way of illustration only, in some embodiments, the layer of optically transparent material is no greater than about 3 mm thick. This includes layers that are no greater than about 1 mm thick, further includes layers that are no greater than about 0.5 mm thick, and still further includes embodiments that are no greater than about 0.2 mm thick. However, thicknesses outside of these ranges can also be used, as the optimal thickness will depend on a variety of factors, including the dimensions of the cone-shaped indentations, the material from which the layer is comprised and the desired light output efficiency.

The layer of optically transparent material (and the dimpled plate itself) can have a variety of shapes and can be mechanically rigid or mechanically flexible. In some embodiments, the layer of optically transparent material has a planar configuration. In other embodiments the layer has a non-planar configuration; an example of which being a cylindrical configuration. Regardless of its geometrical shape, the layer of optically transparent material has an upper surface, a lower surface and at least one edge surface. (As used herein, the terms "upper" and "lower" are not used to imply a requirement that the layer remain oriented such that the upper surface is positioned above the lower surface. Instead, these terms are simply used as a convenient way to differentiate the two surfaces in the description that follows. Depending upon the orientation of the layer, the lower surface may actually be positioned above the upper surface.)

The upper surface of the layer of optically transparent material defines a plurality of inverted, right circular cone-shaped indentations (also referred to as 'conical indentations'). These indentations extend toward the lower surface of the layer of optically transparent material, such that the apex of each cone-shaped indentation points towards the lower surface. The dimensions of the cone-shaped indentations (i.e., their base diameters and depths) are desirably sufficiently large to render the spatial distribution of light via anisotropic reflection wavelength independent. Thus, in some embodiments the base diameters and depths of the conical indentations are at least 100× the longest wavelength emitted by the light sources. This includes embodiments in which the conical indentations have base diameters and depths that are at least 1000× the longest wavelength emitted by the light sources. By way of illustration, the cone-shaped indentations in some embodiments of the light distribution plates have base diameters and cone depths in the range from about 0.1 to about 5 mm (e.g., from about 0.2 to about 3 mm). However, the optimal ratio of base diameter to cone depth will depend upon factors, such as the desired output efficiency of the plate and the desired degree of output light beam collimation. A higher base to depth ratio will generally provide higher output efficiency but less collimated beams relative to a lower base to depth ratio. By way of illustration only, the cone-shaped indentations in some embodiments of the light distribution plates have a cone base diameter to cone depth ratio in the range from about 4:1 to about 1:4 (e.g. about 3:1 to about 1:3 or about 2:1 to about 1:2). For example, in some embodiments cone-shaped indentations have a cone base diameter to cone depth ratio in the range from about 4:1 to about 1.5:1.

The cone-shaped indentations desirably extend through a substantial portion of the thickness of the layer of optically transparent material so as to increases the probability that edge surface-entrant incident and reflected photons traversing the layer of optically transparent material will strike the conical elements at a more planar angle, thereby increasing the efficiency of the spatial redistribution of the light. Thus, in some embodiments the cone depth extends through at least 50% of the thickness of the layer of optically reflective material. This includes embodiments in which the cone depth through at least 70%, at least 90% and at least 99% of the thickness of the layer of optically reflective material. In some embodiments the conical indentations extend completely through the layer of optically reflective material.

The cone-shaped indentations can be arranged in a regular periodic array. Such an arrangement could be used to provide, for example, uniformly pixilated back lighting for an illuminated screen, such as a television screen or a computer screen. Examples of regular periodic arrays include those in which the cone-shaped indentations are arranged in a square matrix or a hexagonal matrix. Alternatively, the cone-shaped indentations can be arranged in an image-defining array. Such an arrangement could be used to provide backlighting for signage. Images that can be defined by the cone-shaped indentations include letters, numbers, and symbols.

The density of the cone-shaped indentations in the layer of optically transparent material can be tailored to the particular application for the light distribution plates and, as such, can vary over a broad range. For example, in a screen illuminating application, the density of the cone-shaped indentations in the upper surface of the layer of optically transparent material might be in the range from about 10 to 500 indentations/cm². In contrast, the density of cone-shaped indentations for a lighting application intended to represent constellations in a night sky might be less than 1 indentation/m².

The lower surface of the layer of optically transparent material is disposed opposite and spaced from the upper surface. The spacing between the lower surface and those portions of the upper surface that do not define the cone-shaped indentations (i.e., the portions of the upper surface between the dimples) defines the thickness of the layer and is generally uniform, or substantially uniform, across the layer. Thus, in planar embodiments of the dimpled plates, the flat portions of the upper surface and the lower surface have a parallel or substantially parallel arrangement, while in cylindrical embodiments of the dimpled plates, the upper and lower surfaces are arranged coaxially.

The layers of optically transparent material have at least one edge surface. The edge surface spans the gap between the upper surface and the lower surface at the perimeter of the layer. The edge surface may be a continuous, unfaceted surface, as in the case of a circular or elliptical layer. Alternatively, the edge surface may comprise two or more facets, as the case of polygon-shaped layers, such as squares or rectangles. In some embodiments, such as those in which the layer of optically transparent material takes on the shape of a cylinder, the layer can have at least two edge surfaces. In the case of the cylinder, these edge surfaces are located at opposite ends of the cylinder.

The optically reflective coating is provided to reflect light incident thereon back into the layer of optically transparent material. The layer of optically reflective material is made from a material that is optically reflective to the light emitted from the chosen input light sources. By "optically reflective" it is meant that the substantial majority of the chosen input light is reflected by the material, rather than transmitted or absorbed. Thus, an optically reflective material will commonly have a percent reflectance of at least 90%. More desirably, the percent reflectance will be at least 95%. Examples of materials that are optically reflective to visible light are metals, such as silver or aluminum.

The optically reflective material may be formed as a continuous coating on the upper surface of the layer of optically transparent material. This coating can entirely or partially fill in the inverted conical indentations or it can be provided as a thin film on the internal surfaces of the inverted conical indentations.

The edge surface, or surfaces, may also be at least partially coated with the optically reflective material. When present on an edge surface, or surfaces, the optically reflective coating is applied such that it defines one or more light input apertures through which input light from one or more light sources can be directed into the layer of optically transparent material. The light input apertures can have a broad range of shapes and sizes and, in its broadest interpretation, a light input aperture can comprise an entire facet of an edge surface that lacks the optically reflective coating. However, in order to optimize the efficiency of the light distribution plate, it is generally advantageous for the one or more light input apertures to conform to the profiles of the one or more input light sources.

The lower surface may also be coated with the optically reflective material. When present on the lower surface, the optically reflective material is applied such that it defines one or more light output apertures through which light reflected by the cone-shaped indentations can exit the light distribution plate. Like the light input apertures, the light output apertures can have a broad range of shapes and sizes. In order to optimize the efficiency of a light distribution plate, it is advantageous to configure the light output apertures such that they are centrally located directly beneath the apexes of the cone-shaped indentations.

The dimpled plates can be formed by machining or molding to impress the conical indentations into one of a variety of common optically transparent, injectable and moldable plastics, such as polycarbonate or poly(methyl-methacrylate). The surfaces can then be metalized with silver or other reflective material using a variety of processes, such as vacuum metallization, liquid deposition, electro-less and electro-chemical plating procedures.

A spatial light distribution apparatus incorporating a light distribution plate will further include one or more near point light sources configured to direct input light into the edge surface of the layer of optically transparent material. In such apparatus, conical indentations 110 can be dimensioned such that the spatial distribution pattern of the input light is wavelength independent. The arrow in FIG. 1 shows how input light can be laterally redirected by the dimpled plates.

As used herein a near point light source refers to a light source having a sufficiently small size that it gives the appearance of light emission from a single point. The near point light sources will also typically be directional light sources that emit light over a solid angle that is less than $2\pi$ (i.e., anisotropically) Examples of directional near point input light sources include light-emitting diodes (LEDs), laser diodes (LDs) and fiber optic waveguides. If the edge surface has more than one facet, one or more near point light sources can be configured to direct light into one or more (e.g., all) of the facets. Simultaneously illuminating more than one facet of the edge surface with near point sources may be advantageous in applications where it is desirable to provide a more uniform illumination of all the conical indentations in a larger, two-dimensional array of indentations in order to achieve a more uniform distribution of light intensity through the light output apertures (i.e., to reduce aperture-to-aperture output light intensity variance).

The near point light sources can be broadband light sources (e.g., broadband white light LEDs), narrowband light sources (e.g., narrowband colored LEDs), monochromatic (e.g., monochromatic LDs), or a combination thereof. AlGaN diodes are a specific example of a suitable near point light source. The directional near point light sources can be mounted directly to (e.g., in contact with) a surface (e.g., an edge surface) of the layer of optically transparent material. Alternatively, they may be adjacent to, but not in direct contact with, the layer of optically transparent material. The near point light sources may comprise elements, such as filters, lenses and reflectors, to tailor the ranges of emitted wavelengths and directionality of the input light.

In some embodiments, a single near point light source is used, while in other embodiments a plurality of near point light sources are used. For example, in some embodiments, the light distribution apparatus include at least 2, at least 4, at least 10, at least 20 or at least 1000 near point light sources.

In some embodiments of the apparatus, the near point light sources emit at the same wavelengths, such that the dimpled plate serves as a lateral light 'diffuser'. However, in other embodiments, a plurality of near point light sources that emit at different wavelengths or wavelength ranges can be used, such that the dimpled plate serves as a color mixer as well as a lateral light diffuser.

Methods of using the dimpled plate as lateral light diffusers comprise directing light from the one or more near point light sources into the edge surface of the layer of optically transparent material, whereby the coating of optically reflective material on the interior surfaces of the inverted, right circular cone-shaped indentations laterally reflects the light, such that it is projected onto the lower surface of the layer of optically transparent material with a pixelated spatial intensity distribution. The phrase "pixelated spatial intensity distribution" refers to a non-uniform spatial light intensity distribution comprising areas (e.g., spots) of higher intensity which correlate with the distribution of the cone-shaped indentations in the dimpled plate.

The number of input light sources and cone-shaped indentations will depend, at least in part, on the desired intensity of the output light and the size of the area to be illuminated with the output light. However, a primary advantage of lighting apparatus incorporating the dimpled plates is that they are able to spread input light having a limited input light illumination area over a larger output light illumination area. Therefore, the apparatus can be designed such that the ratio of input light sources to cone-shaped indentations (which correlates with the ratio of input light sources to 'pixels' in the pixelated spatial intensity distribution of the output light) is significantly lower than 1:1. For example, in some embodiments this ratio is 1:2 or less; 1:3 or less; 1:4 or less 1:10 or less; or even lower.

The dimpled plates can be used in light distribution apparatus for a variety of applications, including lighting and imaging applications. By way of illustration only, description of a few such applications is provided below.

Figure 2:
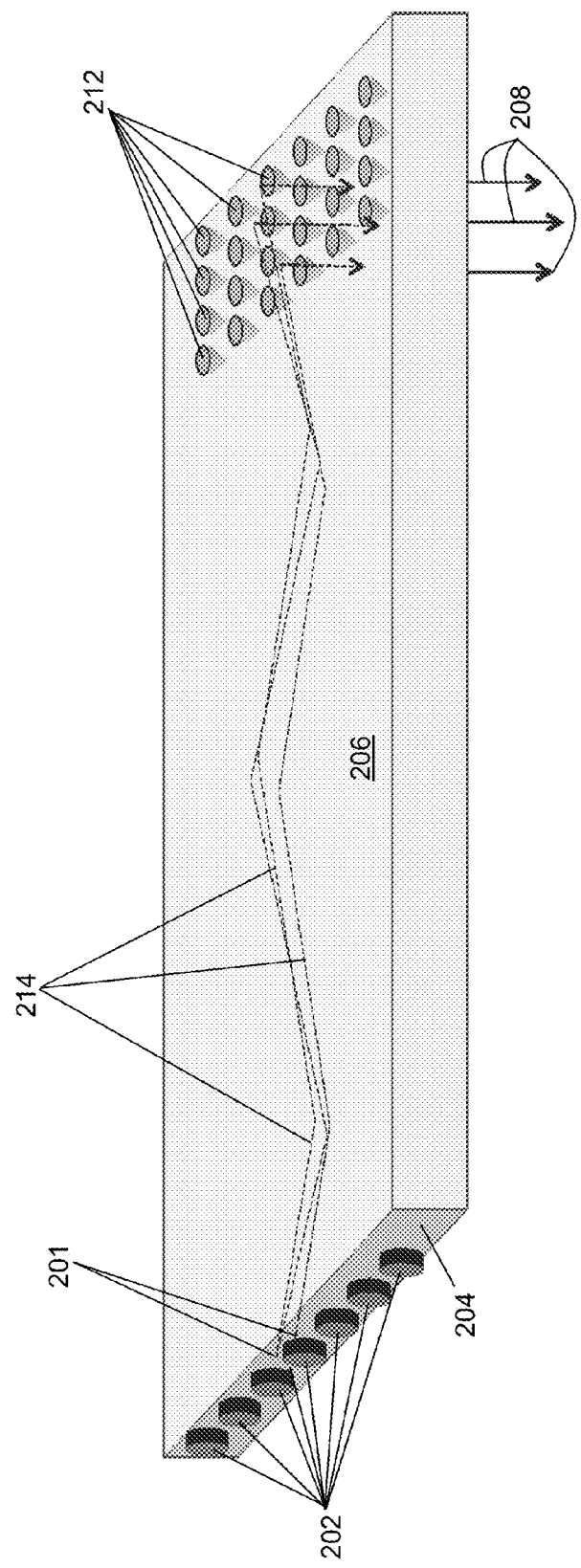
FIG. 2 is a schematic diagram showing a perspective view of a light distribution apparatus suitable for use in residential or commercial indoor lighting applications.

FIG. 2 is a schematic diagram showing a perspective view of a light distribution apparatus configured to distribute input light 201 from a line of directional point light sources 202, mounted on the edge surface 204 of a layer of optically transparent material 206, into a two-dimensional pixilated light array 208 that exits through the lower surface of layer 206. As shown in this figure, the array of conical indentations 212 is arranged in a regular square matrix pattern. The reflective coating is not shown in the figure in order to show the input light paths 214 undergoing reflections from the upper and lower surfaces as they traverse layer 206.

Figure 3:
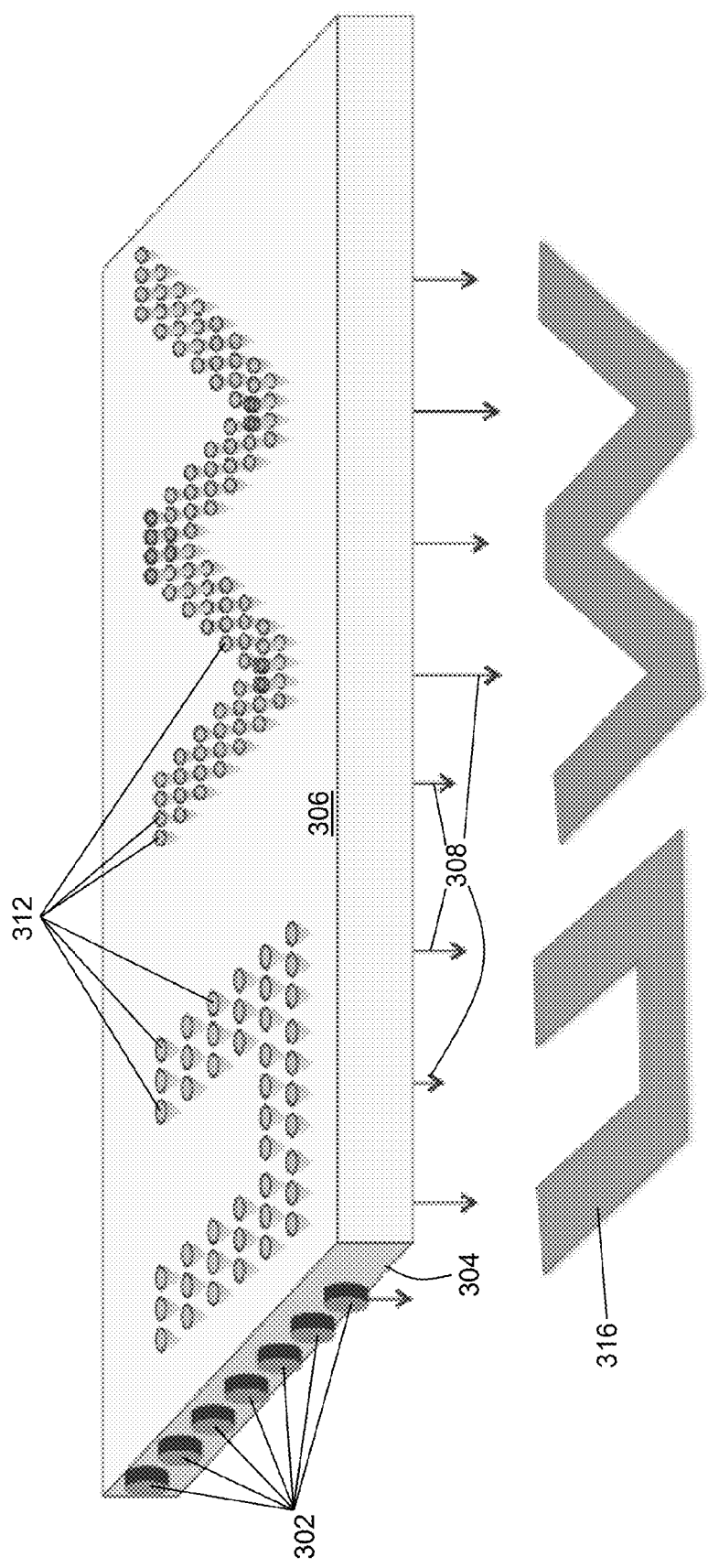
FIG. 3 is a schematic diagram showing a perspective view of a planar light distribution plate suitable for use in signage applications.

FIG. 3 is a schematic diagram showing a perspective view of a light distribution apparatus configured to distribute input light from a line of directional point light sources 302, mounted on the edge surface 304 of the layer of optically transparent material 306, into a an image-forming two-dimensional pixilated light array 308 that exits through the lower surface of layer 306. As shown in this figure, the array of conical indentations 312 is arranged in the image of a "UW". This embodiment of a light distribution apparatus illustrates the use of the apparatus to project a pixilated image 316 onto a surface. (Again, the reflective coating is omitted from the figure so that the internal structure of layer 306 can be viewed.)

Figure 4:
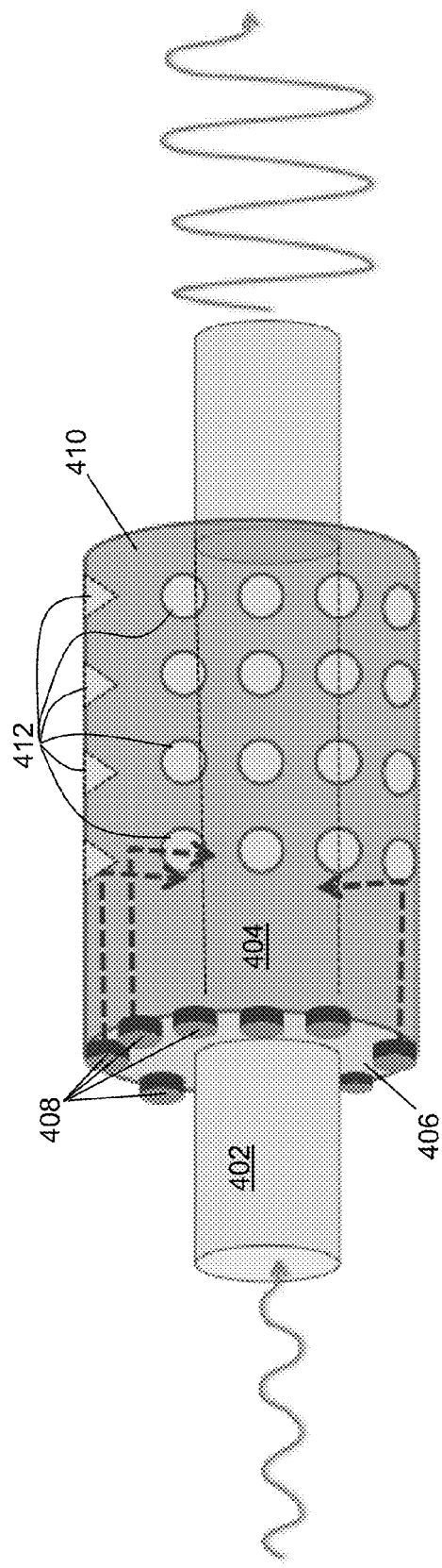
FIG. 4 is a schematic diagram showing a perspective view of an axially-pumped fiber amplifier incorporating a cylindrical light distribution apparatus.

FIG. 4 is a schematic diagram showing a perspective view of a light distribution apparatus configured for use in the co-axial pumping of fiber lasers or amplifiers, such as coaxially pumped erbium-doped optical fiber amplifiers or Raman fiber amplifiers. In this apparatus, a fiber 402 comprising an optical gain medium, such as a fiber doped with rare earth ions such as erbium ($Er^{3+}$), neodymium ($Nd^{3+}$), ytterbium ($Yb^{3+}$), thulium ($Tm^{3+}$), or praseodymium ($Pr^{3+}$), has a cylindrical light distribution plate 404, of the type described herein, disposed around its outer surface in a coaxial arrangement. One edge surface 406 has a plurality of near point light sources 408 arranged in a ring around fiber 402. The upper surface 410 of the layer of optically transparent material in cylindrical plate 402 defines a plurality of conical indentations 412 directed axially inward toward the central longitudinal axis of fiber 402. The near point light sources are selected such that they emit light that acts to optically pump the optical gain medium of fiber 402 when the laser or amplifier is in operation. Using this design, the light from near point sources 408 can be redistributed into a three-dimensional array of collimated light beams that focus the pump light along the length of the fiber to provide axial pumping of fiber 402. Examples of suitable directional near point light sources for use in coaxial optical pumping include LEDs and LDs. This coaxial pumping design is advantageous because, by placing the near point light sources at edge surface 406, the largest inversion population, and therefore the strongest gain, can be achieved where the input signal to be amplified is weakest, thereby optimizing the fiber laser/amplifier gain.

Figure 5:
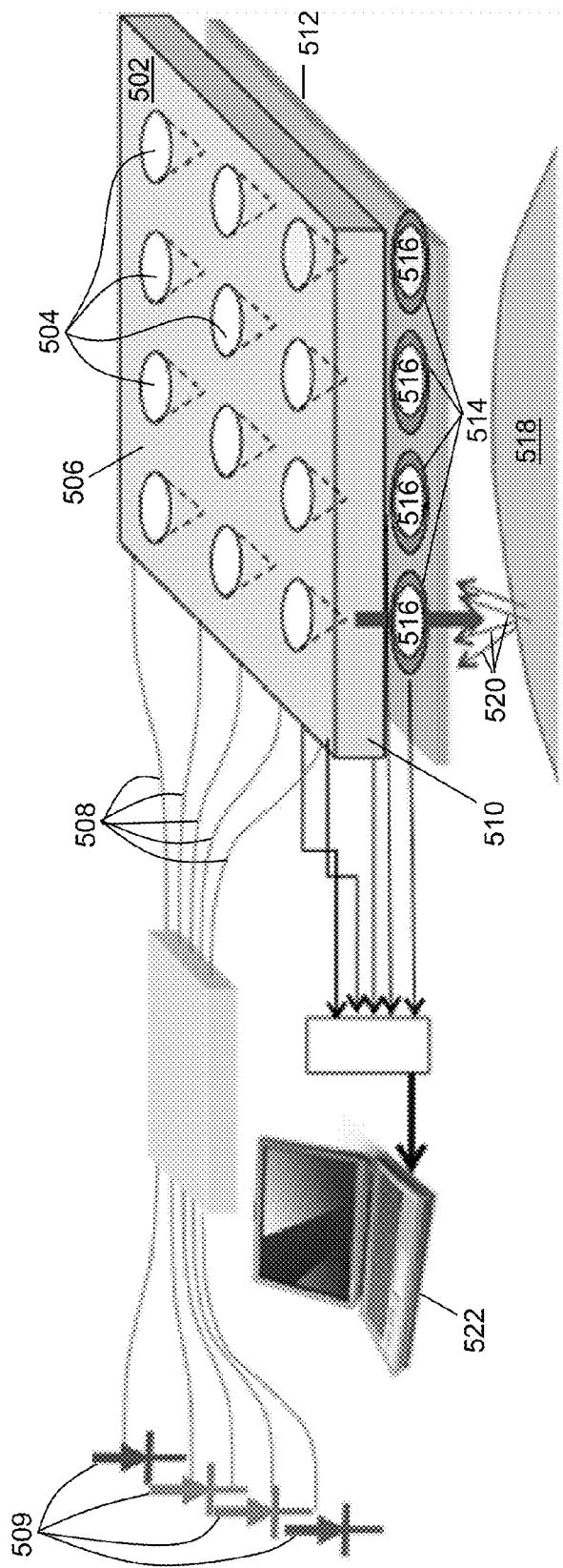
FIG. 5 is a schematic diagram showing a perspective view of a medical imaging device incorporating a light distribution apparatus as a light-delivery system.

FIG. 5 is a schematic diagram of a light distribution apparatus for use in methods for the optical interrogation of biological tissues via techniques such as diffuse reflectance spectroscopy (DRSA) or fluorescence spectroscopy. A detailed description of this apparatus is provided in the experimental examples that follow. This apparatus comprises a light distribution plate 502 having a plurality of inverted, right circular cone-shaped indentations 504 defined in its upper surface 506. In this embodiment, conical indentations 504 are arranged in a regular square matrix. A plurality of near point input light sources, shown here as fiber optic waveguides 508 illuminated by a plurality of differently colored LEDs 509, are configured to direct light into one facet of the edge surface 510. A photodetector array 512 comprising a plurality of ring-shaped photodetectors 514 is disposed below plate 502. Photodetector array 512 is arranged such that the central aperture 516 of each ring-shaped photodetector 514 is aligned directly below an apex of one of the conical indentations 504. A significant advantageous of this design is that it does not require a separate input light source for each detector in the array.

When the apparatus is in use, the bottom surface of the photodetector array can be placed in direct contact with, or in close proximity to, a tissue sample 518. Input light from near point sources 508/509 is then directed into edge surface 510 and traverses the layer of optically transparent material of plate 502. When the light strikes the optically reflective coating on the internal surfaces of conical indentations 504, it is deflected out of plate 502 through a central aperture 516 of a ring-shaped photodetector 514 where it interacts with tissue sample 518. Scattered light 520 from tissue sample 518 then strikes the photoactive surfaces of ring-shaped photodetectors 514. Signals from ring-shaped photodetectors 514 are then collected and sent to a computer 522 for analysis. The spectral response of the back-scattered light can be determined by varying the wavelengths of the input light.

In the light-based diagnostics applications, the wavelengths of the input radiation from the near point sources and the wavelengths of the scattered radiation can be the same, or overlap, as in the case of DRSA, or they can differ, as in the case of fluorescence spectroscopy.

In addition to finding uses in applications for spatially distributing light, as described above, the dimpled plates have applications as light concentrators. In these applications, the dimpled plates are essentially used in reverse. In such applications, input light from one or more input light sources—which may or may not be a near point light sources—is directed into the lower surface of the layer of optically transparent material. The input light is then redirected laterally upon reflection by the reflective conical indentations, such that it exits through an edge surface of layer of optically transparent material. The net effect is to concentrate the light incident on the lower surface of the layer into a smaller surface area at an edge surface through which it exits the dimpled plate. As such, a coating of optically reflective material on the lower surface, if present, can be used to define input light apertures and a coating of optically reflective material on the edge surface, if present, can be used to define output light apertures.

Figure 6:
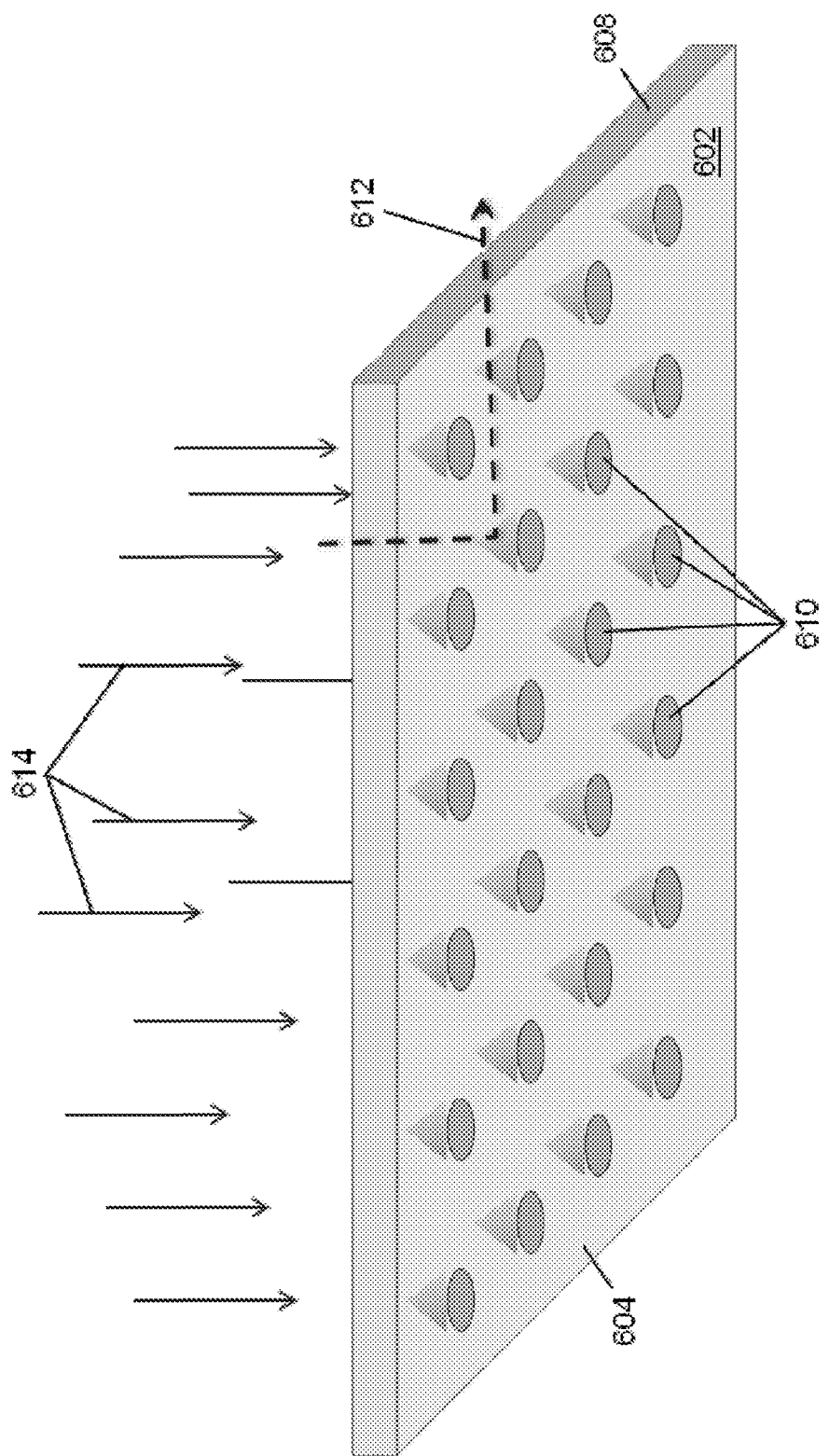
FIG. 6 is a schematic diagram showing a perspective view of a solar concentrator incorporating a dimpled plate.

FIG. 6 is a schematic diagram showing a perspective view of a dimpled plate serving as a solar concentrator. The dimpled plate can have the same basic structure as the plates used in light distribution applications, although the dimensions of the layer of optically transparent material and the density and dimensions of the inverted, right circular cone-shaped indentations may be selected to optimize the efficiency of light concentration, rather than distribution. In particular, in order to decrease the probability of double reflections for the conical indentations, a lower density of conical indentations may be advantageous. As shown in FIG. 6, the dimpled plate comprises a layer of optically transparent material 602, the layer of optically transparent material comprising a dimpled upper surface 604; a lower surface disposed opposite the upper surface; and an edge surface 608 connecting the upper and lower surfaces along their perimeters. Upper surface 604 of the plate defines a plurality of inverted, right circular cone-shaped indentations 610 that extend toward lower surface. A coating of optically reflective material (represented by the gray shading inside conical indentations 610) is disposed on upper surface 604. The coating of optically reflective material may also be disposed on portions of edge surface 608, although the facet of edge surface 608 through which the deflected light 612 exits layer 602 should be at least partially uncoated by the optically reflective material. The coating of optically reflective material can also be provided on the lower surface such that it defines one or more light input apertures. In such embodiments, the light input apertures can be aligned such that the center of each aperture is aligned with the apex of one of the inverted, right circular cone-shaped indentations (i.e., aligned such that a single axis runs through the center of each aperture and the apex of the cone-shaped indentation with which it is aligned). As shown by the dashed line in the figure, input light 614 (e.g., solar radiation) incident upon the lower surface of layer 608 is laterally redirected by reflective cone-shaped indentations 610 onto (and through) edge surface 608.

The density of the conical indentations in the solar concentrators can be tailored to achieve an acceptable balance between the input light capture efficiency and the probability of multiple reflections, which are directly related. The density of conical indentations in the upper surface of the light concentrators can be measured as the percent of the total area of bases of the cone-shaped indentations based on the total area of the bases of the cone-shaped indentations and the remaining area of the upper surface that does not define the cone-shaped indentations. In some embodiments of the solar concentrators, this percentage is 30 percent or lower. This includes embodiments in which this percentage is 20 percent or lower.

If a higher input light capture intensity is desired, a plurality (e.g., five or more) of the light concentrator plates can be arranged in a vertical stack (i.e., with the dimpled 'upper' surface of each plate aligned over and adjacent to the lower surface of its underlying neighboring plate), such that input light incident upon the uppermost 'lower' surface that is not reflected by the reflected conical indentation in that plate, can be passed through into the underlying concentrator plate. In this arrangement, it is desirable for the cone-shaped indentations in different plates within the stack to be positioned such that they are not aligned directly below the cone-shaped indentations in the overlying plate. Staggering the indentations in different plates in this manner can increase the input light capture efficiency of the stack.

EXAMPLES

Example 1

Figure 7:
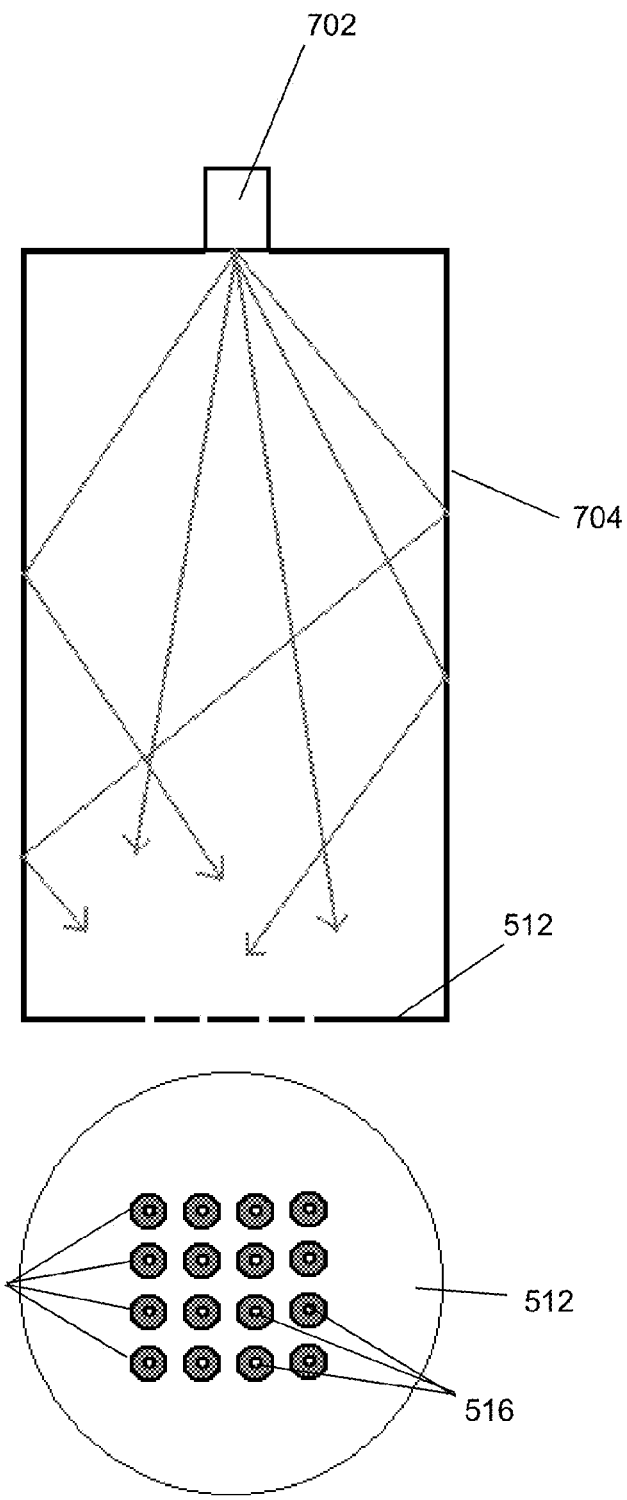
FIG. 7 is a schematic diagram of a back-lit photodetector array, as described in example 1.

This example illustrates the use of a planar light distribution plate, of the type shown in FIG. 5, as a source and detector in diffuse reflectance spectroscopy (DRSA) for applications in the non-destructive imaging of tumor margins surrounding lumpectomy masses. In this example, the performance of the edge-lit light distribution plate is compared to a more conventional apparatus, shown in FIG. 7, which utilizes direct backlighting. The comparison is based on a ray-tracing program that computes the throughput and uniformity of the light distribution across the photodetectors in the photodetector array.

Figure 8:
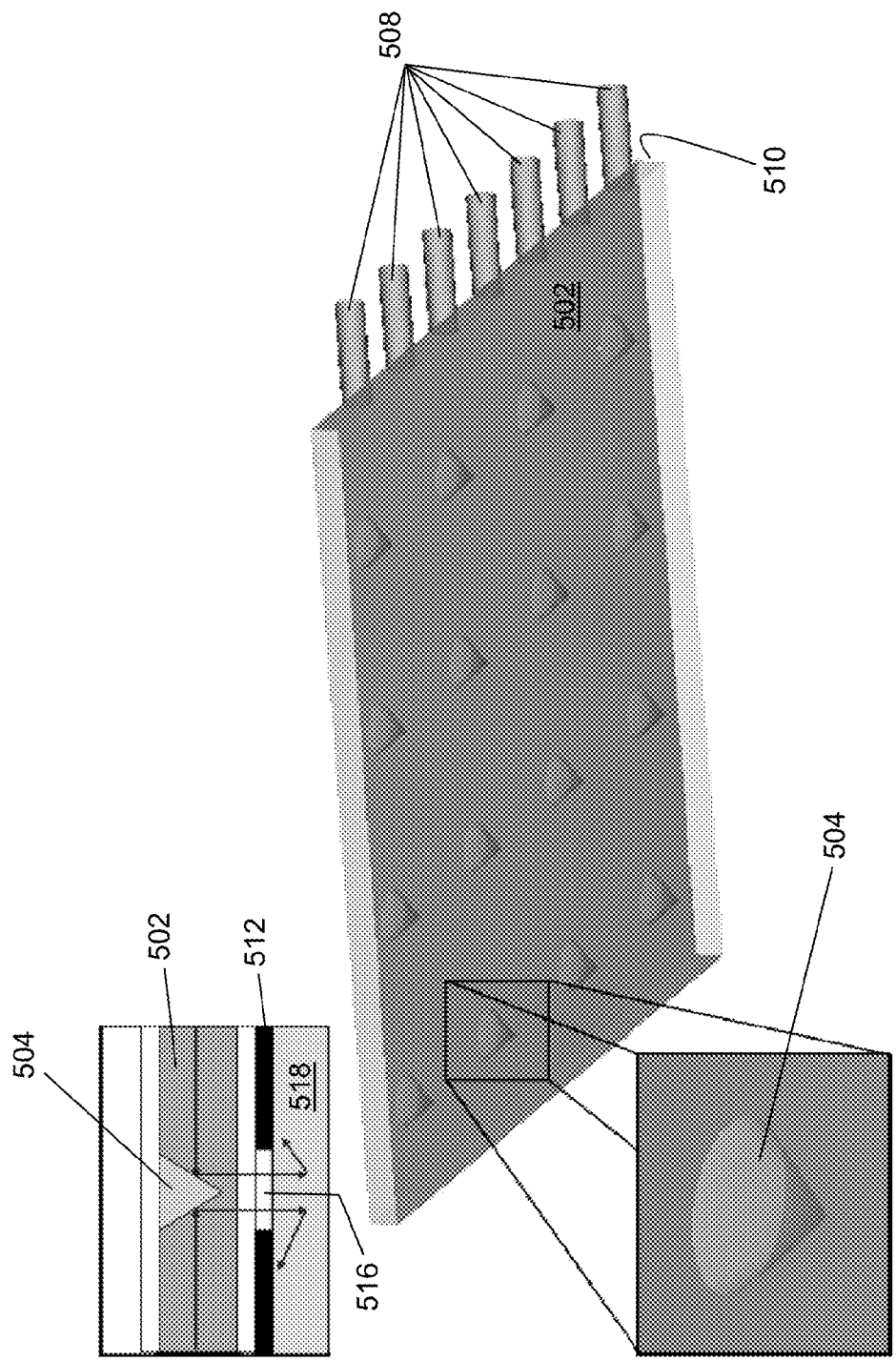
FIG. 8 is a schematic diagram of an edge-lit planar light distribution plate, as described in example 1.

The DRSA apparatus used in this example comprised a photodetector array 702 comprising a set of ring-shaped Si photodetectors 704 arranged in a square matrix on a 7.5 mm×7.5 mm grid, over a 53 mm diameter illuminated area. (A bottom view of photodetector array 702 is shown rotated 90° with respect to the plane of the image in the lower panel of FIG. 7.) Each detector had a 1 mm aperture 516 through its center. During DSRA, the photodetector array is placed against a tissue sample and the tissue is illuminated through the apertures from the back of the photodetectors. A set of 8 illuminating (input) wavelengths between 400-600 nm from a filtered thermal source, with a bandwidth of ~10 nm, were used for optimal absorption and scattering contrast between healthy and malignant tissues. Two optical geometries for providing approximately uniform illumination to each of the detector apertures were examined by way of numerical simulation: direct back-illumination (FIG. 7) versus illumination with an edge-lit light distribution plate. The design of the planar light distribution plate is shown in FIG. 5. FIG. 8 is another diagram of the plate, showing a perspective view of the inverted conical indentations (lower expanded inset) and the path of the input light during DRSA (upper inset).

The effectiveness of each of apparatus can be expressed in terms of the transfer efficiency of light from near point sources to the apertures of the photodetectors, and the uniformity (variance) of the light intensity emitted by the apertures. (In an actual application, the uniformity of the illumination and the required power would be a function of the absorption and scattering measurements in the tissue, and a minimum signal-to-noise ratio (SNR) of the Si photodetectors.)

Comparative Apparatus—Free-Space Backside Illuminator (FIG. 7):

In the comparative apparatus, the photodetector array was illuminated directly from a spatially dispersed input light source 702 disposed directly above and behind photodetector array 512. The near point input light source comprised a thermal source coupled to a 5 mm liquid light guide (numerical aperture 0.57). The light emitted by the liquid light guide was modeled as a point source with uniform intensity per solid angle, up to a cone half-angle of 30° (i.e., NA=0.5)—which is a good approximation to the 5 mm light guide used experimentally. As a compromise between uniform illumination and diminished light flux, the end of the light guide was placed 153 mm from the plane of the photodetector array and oriented normal to the photodetector array plane over the center of the grid. Because of the large aperture size (1 mm) and the choice of wavelength (400-600 nm), a Monte Carlo ray tracing method (Zemax®) was used to calculate the intensity of light through each aperture. Simulations (Zemax®) at 400, 500, and 600 nm wavelengths were performed with this geometry. Although a ray tracing method dictated that the distribution of light is wavelength-independent, the Monte Carlo ray launching scheme will produce a small statistical variance ($\sim 1\times 10^{-5}$) with wavelength and hence only the results for the 500 nm illumination wavelength are presented in Table 1. The fraction of the launched power which illuminates the apertures was, on average $3.1\times 10^{-4}$, with a variance of $1.1\times 10^{-4}$. Not surprisingly, the fractional transmitted powers summed over the 16 apertures ~0.49%, was approximately that of the fractional area occupied by the apertures relative to the illumination area (0.64%). The illumination pattern varied over the aperture plane due to the reflection of light from the side walls of the back illuminator cavity 704 leading to the formation of 'ears' on the illumination pattern. These internal reflections lead to the non-uniform illumination and are a function of the illuminator cavity length and the numerical aperture of the input light source. An experimental measurement of a prototype back-illuminated device was obtained and compared to the calculated results.

The experimental and calculated results are given in Table 1. The experimental data exhibit greater variation in the distribution of light from aperture to aperture with comparable output. Therefore, the calculated values serve as an upper limit to the achievable performance of such an illuminator for a specific geometry. These experimental and calculated results both indicate the validity of the modeling approach as well as the difficulties with a purely backside illumination strategy.

TABLE 1

Back-illuminated approach. Percent deviation of illumination from individual aperture relative to the maximum value.

| Experimental | | | | | Calculated | | | |
|---|---|---|---|---|---|---|---|---|
| 1 | 2 | 3 | 4 | | 1 | 2 | 3 | 4 |
| −88% | −49% | −56% | −96% | 1 | −59% | −49% | −49% | −60% |
| −56% | 0% | −8% | −53% | 2 | −49% | 0% | −1% | −48% |
| −55% | −18% | −11% | −52% | 3 | −49% | 0% | −2% | −49% |
| −88% | −53% | −57% | −94% | 4 | −59% | −48% | −48% | −60% |

Edge-Lit Light Distribution Plate Illuminator:

The layer of optically transparent material in the light distribution plate was a 1 mm thick layer of glass (e.g., Ohara PBL-7 glass, n~1.55), whose 1 mm edges and top surface were coated with silver as an optically reflective material. The same square detector array used in the back-illuminated example was placed directly below the plate: 16 photodetectors with 1 mm apertures on a 7.5 square grid (surface area $24\times 24$ mm$^2$) were disposed just below the plate. To insure uniform illumination across the breadth of the light distribution plate, a set of 7 near point input light sources were spaced equally across one of the facets of the plate's edge surface. These sources were seven step-index fibers, core diameter 1 mm and NA=0.5. A set of right circular cones were machined into the waveguide, with their apexes aligned over the centers of the photodetector apertures (see FIG. 5). An effective cone geometry was found to have a 1.5 mm diameter base with a 0.75 mm base-apex height (i.e., cone depth).

A Monte Carlo ray tracing method (Zemax®) was used to simulate the structures examined here. Typically $10^7$ rays were launched from the source. Rays divided at partially reflective and refractive interfaces as dictated by the Fresnel equations. For multiple reflections/refractions, the number of divisions was limited to 4000 in order to produce a reasonable computation time.

Table 2 lists the fractional distribution of optical power coupled to the apertures by the conical reflectors. Again, results at 500 nm are reported as representative of the 8 DSRA probe wavelengths between 400-600 nm, noting that there is a small (<10%) variation in the reflectance of the silver coating. The mean fraction of the input power coupled to an aperture was about 0.0031 with a variance of $3.2\times 10^{-4}$. A total of 4.9% of the optical power launched by the 7 input sources exited the apertures. The remaining power was absorbed into the metal reflecting surface. This was a 10-fold higher average throughput efficiency than that provided by the back-illumination scheme.

The light leaving the apertures was not entirely vertically collimated; ~67% of the rays exiting the aperture were within a cone angle of 20° to the vertical. Decreasing the size of the conical indentations (i.e., decreasing the conical depth in proportion to the base diameter) decreases the radius of the light exiting the aperture, but it also decreases the fraction of optical power deflected into the apertures.

TABLE 2

Percent deviation of illumination of an individual aperture relative to the maximum value for a planar light distribution plate illuminated from a single edge facet. (The illumination direction was from the 4:1 4:2 4:3 4:4 side of the photodetector array.)

| | Calculated | | | |
|---|---|---|---|---|
| | 1 | 2 | 3 | 4 |
| 1 | −26% | −19% | −12% | −17% |
| 2 | −26% | −31% | −20% | −15% |
| 3 | −24% | −8% | −13% | −16% |
| 4 | −7% | −1% | −6% | 0% |

The data in Table 2 is for illumination from a single facet (side) of the edge surface of the rectangular light distribution plate. The aperture-to-aperture uniformity can be improved by providing light sources from all four sides simultaneously This is easily accomplished using compact LED sources or through simple fiber coupling. Model calculations showed that for this case the uniformity of aperture illumination was better than ±3%, far exceeding the back-side illumination or the single-side illuminated light distribution plate.

Table 3 summarizes and compares the performance results from the back-illuminated structure (model and measurement) to the edge-lit planar light distribution plate. As discussed above, the planar light distribution plate was superior in uniformity and light utilization.

TABLE 3

Calculated and Measured Power Utilization of different light delivery systems at 500 nm.

| System | Fraction of launched power at each aperture | Variance in transmitted power at apertures | Total Power utilization (16 apertures) |
|---|---|---|---|
| Free Space Back-Side Illumination (simulated) | $3.1 \times 10^{-4}$ | $1.1 \times 10^{-3}$ | 0.49% |
| Free Space Back-Side illumination (measured with prototype system) | $5.8 \times 10^{-4}$ | $5.5 \times 10^{-5}$ | 0.92% |
| Edge-Lit Planar Waveguide | $3.1 \times 10^{-3}$ | $3.2 \times 10^{-4}$ | 4.9% |

Example 2

This example describes the performance of a planar light distribution plate as a function of plate thickness, and conical indentation dimensions, based on model ray calculations. The geometry of the planar light distribution plate for this example is that shown in FIG. 5. The layer of optically transparent material for the model light distribution plate was taken to be a layer of PMMA and the coating of optically reflective material was taken to be silver with an assumed surface reflectivity of 97%. The near point input light sources were taken to be multimode optical fibers. The photodetector array was modeled as an array of ring-shaped p-n junctions fabricated in a 610 µm thick silicon layer supported by a 300 µm thick glass support layer. The depth of the conical indentations was set to the radius of the conical indentations for the model calculations, which were carried out using a Monte Carlo ray tracing method (Zemax®). The result of the model power calculation was a plot (FIG. 9) of the fraction power deflected into all of the 16 photodetectors in the 4×4 photodetector array.

Figure 9:
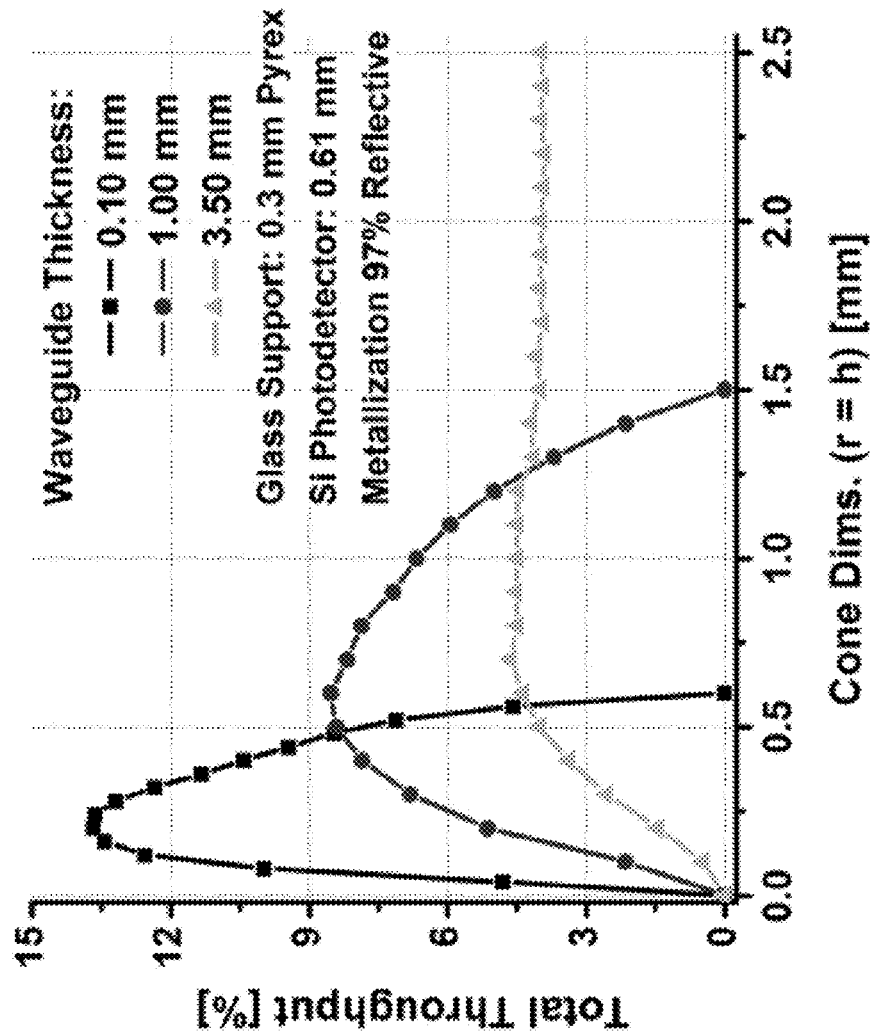
FIG. 9 is a graph showing light throughput for a planar light distribution plate as a function of plate thickness and cone geometry, as described in example 2.

From FIG. 9 it can be deduced that the light deflection efficiency of the inverted conical indentations increases with decreasing plate thickness; and the percentage light output improves significantly as the thickness of the planar light distributing plate (and cone dimensions) decreases. For example, in the case of a 375 µm cone radius, ~12% of the input light is predicted to exit the 16 light output apertures.

All of the geometries represented in FIG. 8 showed approximately the same degree of aperture-to-aperture throughput variance. The standard deviation was typically σ<0.27. Expressed another way, 95% of the light output apertures deviated less than ±10% (26/ave.) from the average. The output beam profile was approximately a Gaussian beam with a divergence half-angle of ~37°. This edge-lit, planar light distribution plate geometry thus provided a relatively uniform distribution of light "pixels" exiting normal to a plate at well defined positions.

Figure 10:
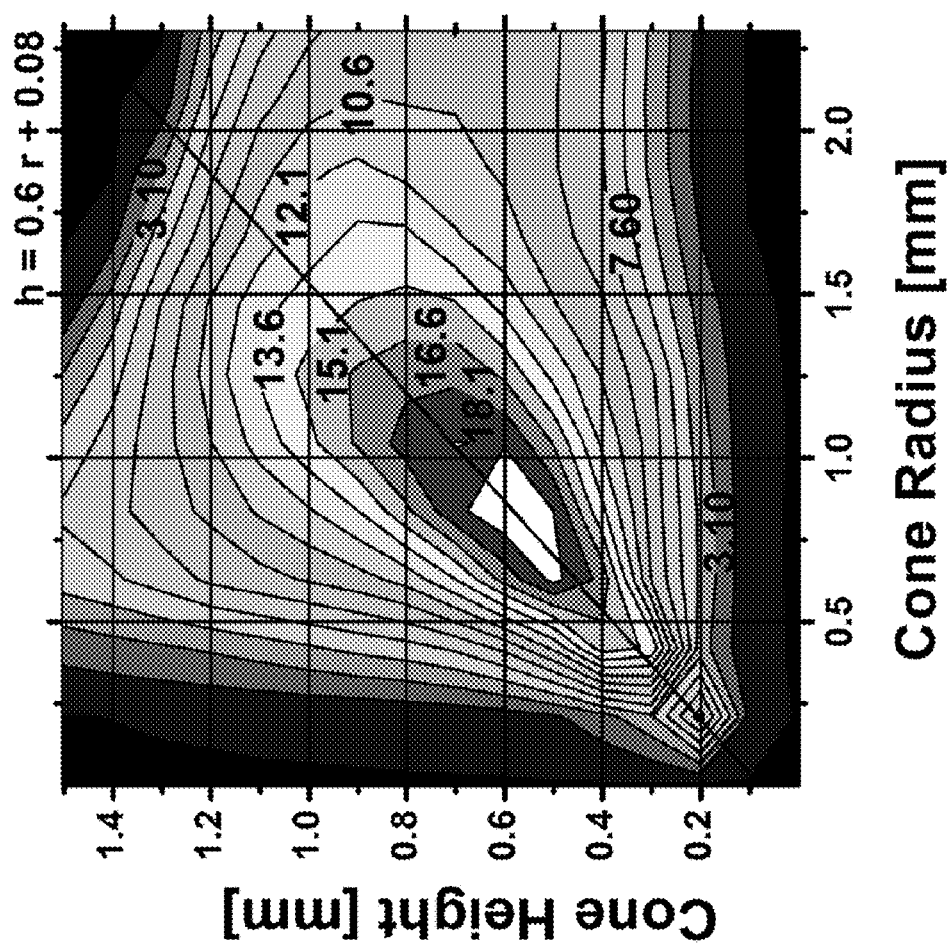
FIG. 10 is a graph of the fraction of power deflected by a reflective conical indentation as a function of cone height (depth) and cone radius.

FIG. 10 is a graph of the fraction of power deflected by a reflective conical indentation as a function of cone height (depth) and cone radius, based on the Zemax calculations. As shown in this figure, cone base diameter (i.e. 2× cone radius) to cone depth ratios in the range from about 4:1 to about 1.5:1 have high throughput, although ratios outside of this range can also be effective.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A light distribution apparatus comprising:
   (a) a light distribution plate comprising:
      (i) a layer of optically transparent material, the layer of optically transparent material comprising an upper surface; a lower surface disposed opposite the upper surface; and an edge surface that bridges the upper and lower surfaces along their perimeter; wherein the upper surface defines a plurality of inverted, right circular cone-shaped indentations that extend toward the lower surface; and
      (ii) a coating of optically reflective material disposed on at least those portions of the upper surface that define the interior surfaces of inverted, right circular cone-shaped indentations; and
   (b) one or more near point light sources configured to direct light into the edge surface of the layer of optically transparent material;
   wherein the light distribution plate is configured such that light directed into the edge surface of the layer of optically transparent material by the one or more near point light sources and reflected from the coating of optically reflective material on the interior surfaces of the plurality of inverted, right circular cone-shaped indentations will be projected onto the lower surface of the layer of optically transparent material with a pixelated spatial intensity distribution.

2. The apparatus of claim 1, wherein the coating of optically reflective material is disposed over at least a portion of the lower surface and at least a portion of the edge surface of the layer of optically transparent material, such that the coating of optically reflective material defines at least one input light aperture along the edge surface and a plurality of output light apertures on the lower surface, the centers of the output light apertures being aligned with the apexes of the inverted, right circular cone-shaped indentations.

3. The apparatus of claim 1, wherein the depth of the inverted, right circular cone-shaped indentations is at least 70% of the thickness of the layer of material and still further wherein the inverted, right-circular cone-shaped indentations have a cone base diameter in the range from about 0.1 mm to about 5 mm and a cone depth in the range from about 0.1 mm to about 5 mm.

4. The apparatus of claim 3, wherein the inverted, right-circular cone-shaped indentations have a cone base diameter to cone depth ratio in the range from 3:1 to 1:3.

5. The apparatus of claim 4 comprising at least two near point light sources, wherein the ratio of near point light sources to inverted, right circular cone-shaped indentations is no greater than 1:2.

6. The apparatus of claim 1, wherein the plurality of inverted, right circular cone-shaped indentation are arranged in a regular array.

7. The apparatus of claim 1, wherein the plurality of inverted, right circular cone-shaped indentations are arranged in an imaging-defining array.

8. The apparatus of claim 1, wherein the plurality of inverted, right circular cone-shaped indentations extend through at least 90% of the thickness of the layer.

9. The apparatus of claim 1, wherein the one or more near point light sources are broadband sources.

10. The apparatus of claim 1, comprising a plurality of near point light sources, wherein different near point light sources in the plurality emit light in different wavelength ranges.

11. The apparatus of claim 2, wherein:
the layer of optically transparent material is a planer layer of material;
the one or more near point light sources comprise a plurality of near point light sources; and
wherein the light distribution plate is configured such that light directed into the edge surface of the layer of optically transparent material by the one or more near point light sources and reflected from the coating of optically reflective material on the interior surfaces of the inverted, right circular cone-shaped indentations will be projected onto the lower surface of the layer of optically transparent material with a two-dimensional pixelated spatial intensity distribution.

12. The apparatus of claim 1, wherein:
the coating of optically reflective material is disposed over at least a portion of each of the upper surface, the lower surface, and the edge surface of the layer of optically transparent material, the optically reflective material defining a plurality of output light apertures on the lower surface; and
the apparatus further comprises a plurality of ring-shaped photodetectors disposed below and facing away from the lower surface, wherein the central aperture of each ring-shaped photodetector is aligned with an output light aperture.

13. The apparatus of claim 1, wherein:
the layer of optically transparent material is configured into a cylinder, whereby the upper surface provides the exterior surface of the cylinder, the lower surface defines the interior annular channel of the cylinder and the layer comprises two edge surfaces located at opposite ends of the cylinder;
the coating of optically reflective material is disposed over at least a portion of each of the upper surface, the lower surface, and the edge surface of the layer of optically transparent material, the optically reflective material defining a plurality of input light apertures along an edge surface and a plurality of output light apertures on the lower surface; and
the one or more directional near point light sources are configured to direct light into the input light apertures.

14. The apparatus of claim 13, further comprising an optical fiber disposed within the interior annular channel of the cylinder.

15. A method for the spatial distribution of light from one or more near point light sources the method comprising: using the apparatus of claim 1, directing light from the one or more near point light sources into the edge surface of the layer of optically transparent material, whereby the coating of optically reflective material on the interior surfaces of the inverted, right circular cone-shaped indentations laterally reflects the light, such that it is projected onto the lower surface of the layer of optically transparent material with a pixelated spatial intensity distribution.

16. A dimpled waveguiding plate comprising:
(a) a layer of material that is optically transparent to visible light, the layer of material comprising an upper surface; a lower surface disposed opposite the upper surface; and an edge surface that bridges the upper and lower surfaces along their perimeter; wherein the upper surface defines a plurality of inverted, right circular cone-shaped indentations that extend toward the lower surface; and further wherein the depth of the inverted, right circular cone-shaped indentations is at least 70% of the thickness of the layer of material; the inverted, right-circular cone-shaped indentations have a cone base diameter in the range from about 0.1 mm to about 5 mm and a cone depth in the range from about 0.1 mm to about 5 mm; and the inverted, right-circular cone-shaped indentations have a cone base diameter to cone depth ratio in the range from 4:1 to 1:4; and
(b) a coating of material that is optically reflective to visible light disposed on at least those portions of the upper surface that define the interior surfaces of inverted, right circular cone-shaped indentations; and
(c) a coating of material that is optically reflective to visible light disposed on a portion of the lower surface of the layer of optically transparent material, such that the coating of optically reflective material on a portion of the lower surface defines one or more output light apertures through which light reflected by the cone-shaped indentations can exit the layer of material.

17. The plate of claim 16, wherein the coating of optically reflective material on a portion of the lower surface defines a plurality of output light apertures on the lower surface, the centers of the output light apertures being aligned with the apexes of the inverted, right circular cone-shaped indentations.

18. The plate of claim 16, further comprising a coating of material that is optically reflective to visible light disposed over a portion of the edge surface of the layer of optically transparent material, such that the coating of optically reflective material disposed over a portion of the edge surface defines at least one input light aperture along the edge surface.

19. The plate of claim 18, wherein the coating of optically reflective material on a portion of the lower surface defines a plurality of output light apertures on the lower surface, the centers of the output light apertures being aligned with the apexes of the inverted, right circular cone-shaped indentations.

20. The plate of claim 17, further comprising a plurality of ring-shaped photodetectors disposed below and facing away from the lower surface, wherein the central aperture of each ring-shaped photodetector is aligned with an output light aperture.

* * * * *

UNITED STATES PATENT AND TRADEMARK OFFICE
CERTIFICATE OF CORRECTION

| | | |
|---|---|---|
| PATENT NO. | : 8,668,370 B2 | Page 1 of 1 |
| APPLICATION NO. | : 13/463151 | |
| DATED | : March 11, 2014 | |
| INVENTOR(S) | : Leon McCaughan et al. | |

It is certified that error appears in the above-identified patent and that said Letters Patent is hereby corrected as shown below:

IN THE CLAIMS

Col. 15, line 30 (Claim 6)

Delete the phrase "cone-shaped indentation" and replace it with the phrase -- cone-shaped indentations --

Signed and Sealed this
Nineteenth Day of August, 2014

Michelle K. Lee
*Deputy Director of the United States Patent and Trademark Office*